United States Patent
Majumdar et al.

(10) Patent No.: US 6,639,615 B1
(45) Date of Patent: Oct. 28, 2003

(54) GENERIC METHOD FOR PROGRAMMATICALLY LOCATING ANY DOCUMENT IN A COMPUTER NETWORK SYSTEM

(75) Inventors: Rajarshi Majumdar, Irvine, CA (US); Mark Jeffrey Tadman, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/321,695

(22) Filed: May 28, 1999

(51) Int. Cl.[7] .................................................. G06T 3/00
(52) U.S. Cl. .................................... 345/839; 345/835
(58) Field of Search ................................. 345/762, 765, 345/744, 764, 781, 835, 839, 837

(56) References Cited

U.S. PATENT DOCUMENTS 5,877,765 A * 3/1999 Dickman et al. ........... 345/738
5,933,599 A * 8/1999 Nolan ......................... 345/734

* cited by examiner

*Primary Examiner*—Cao (Kevin) Nguyen
(74) *Attorney, Agent, or Firm*—Phuong-Ouari Hoang; Mark T. Starr; Lise A. Rode

(57) ABSTRACT

A method in a computer system is disclosed for programmatically locating any file and building a shortcut for future reference to that file. The method also enables the arrangement of the shortcuts in an organized and hierarchical fashion. First, a shortcut cache and a mapping file is created if one does not exist. Then, the shortcut cache and the mapping file is searched for a shortcut for the file. The shortcut contains the location and name of the file. If the shortcut name is not found, then the shortcut directory for the current user is located in the system registry, and it is searched for the shortcut name. If the shortcut name is still not found, the shortcut directory for all users is located in the system registry, and it is searched for the shortcut name. If the shortcut name is found then it is stored in the shortcut cache and the mapping file; and, the location and name of the file is returned to the requestor.

14 Claims, 10 Drawing Sheets

GENERIC METHOD FOR PROGRAMMATICALLY LOCATING ANY DOCUMENT IN A COMPUTER NETWORK SYSTEM

FIELD OF THE INVENTION

The present invention generally relates to a method and system for automating the location of a document in a computing environment, and more particularly, it relates to a method and system for locating and building source locations for generic files that may be stored somewhere in a computing environment.

BACKGROUND OF THE INVENTION

A computer system can be configured to run a variety of different applications and processes. Each of such applications and processes invoke different types of files, which can be generically referred to as documents. In today's fast cycle world, it is increasingly common to configure a computer system to also access different versions of the same document. Documents typically are stored on storage media directly attached to the computer system, however, they can also be located on network attached storage media when operating in a networked, or distributed computer environment.

The document selection process includes reading and parsing a directory or file names by the user with knowledge of the installed software. The present invention provides a solution that allows an algorithm to identify and correctly find the requisite document with minimal user interface by the use of a caching technique.

On the other hand, a network computing architecture includes a distributed computing environment, which generally comprises one or more server computers, one or more client PC's and may include one or more mainframe hosts. All computers are linked to one another through a network, which may be a local area network (LAN) running on an ethernet link, or a wide area network (WAN). The hard disk drive of each computer coupled to the network stores files in their structures. These files may or may not be shared with other computers in the network depending upon the permission granted by the network administrator. Where a large number of computers participate in such networks, it is essential to automate as much of the processes involved in distributed computing as possible. The present invention solves one of those critical processes and involves automating the search for files distributed throughout the network.

SUMMARY OF THE INVENTION

An object of the present invention is to provide a method that allows software developers to generically refer to any existing file located in a computer system.

Another object of the present invention is to provide a method that allows software developers to generically refer to any existing file in a distributed environment, which may include one or more computers and multiple storage units.

A feature of the present invention is to provide software developers and users with a graphical user interface that enables the selection of a document without previous knowledge of existence or location of the document.

Another feature of the present invention is the provision of an automated arrangement of documents in a predetermined or user defined, fashion in a computer system without the need for physical intervention by a software developer or user.

An advantage of the present invention is that, due to its modular design, it can be incorporated into any program written in most of the current popular programming languages (e.g., C++ or Visual Basic).

Another advantage of the present invention is that software developers do not need to know a priori where a specific file physically resides in a distributed network. The present invention is capable of referring to a specific file in a generic fashion.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which the drawings form a part of this application.

DETAILED DESCRIPTION OF ONE EMBODIMENT

Figure 1:
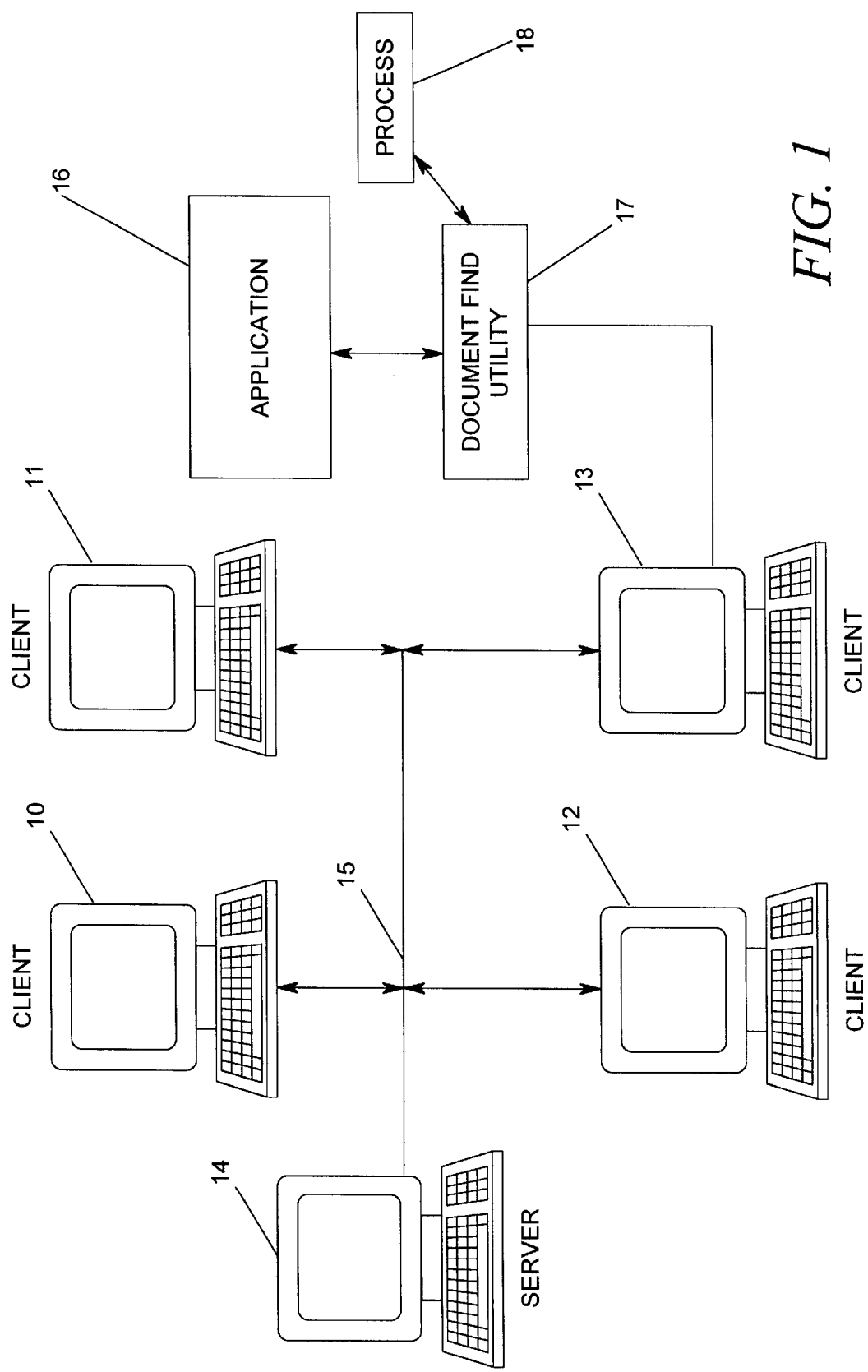
FIG. 1 is a block diagram of a computer system that may employ the present invention.

Referring now to FIG. 1, a block diagram of a system that may employ the present invention is shown. A multiplicity of clients 10 through 13 are coupled to a server 14 by means of a network 15, which may comprise a local area network (LAN) or a wide area network (WAN) Such networks are well-known in the art and will not be disclosed further herein. One of the clients, such as the client 13, is executing an application 16 or a process 18 that utilizes the document find utility module 17 of the present invention. As alluded to hereinabove, the document find utility program of the present invention locates and builds source locations (i.e., paths) for any generic files that may be present somewhere in a distributed computing environment. It is pointed out that the term computer system, as used herein, may include one or more computers. That is, the present invention may be useful in a multiple-computer system, but is not limited to such systems.

Figure 2:
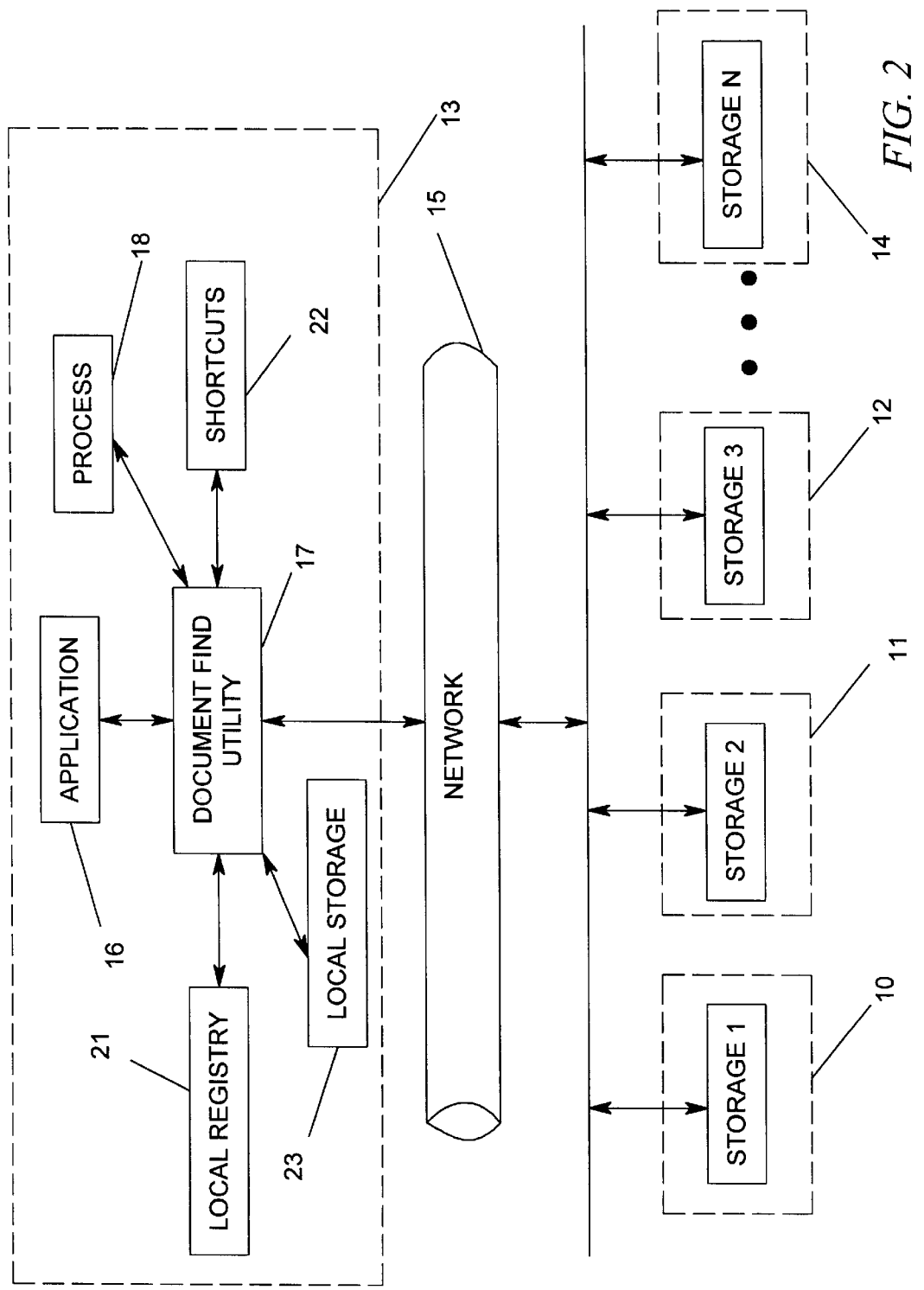
FIG. 2 is a software module block diagram of the present invention.

Referring now to FIG. 2, a software module block diagram of the present invention is shown. The document find utility module 17 of the present invention is coupled to the network 15 in the same manner as described hereinabove. Also, within the client 13 is the application 16 and process 18. The document find utility program 17 also has access to a local registry 21, shortcuts 22 and a local storage 23. The local registry 21 is a file stored in the local storage for remembering where system information is kept, i.e. , any information that any application wants to remember. The shortcuts 22 are a generic method for pointing somewhere else in the system. An example of a shortcut is an icon typically used with Windows software that points to another application (e.g., word processing).

Storage 1, which is disposed within the client 10, is accessible via the network 15. In a similar manner, storage 2 is disposed within the client 11; storage 3 is disposed within the client 12, and storage N is disposed within the server 14. The point to be made here is that the storage for each of the computers on the network is accessible via the network 15. This point will be more fully appreciated hereinbelow under the description of the process details. The document find utility 17 can search not only the local storage 23 for a file, but it c an also search the storage associated with each of the clients in the network. In accordance with the present invention, once the path to the sought for file is found, a shortcut to that file is stored in the local storage 23.

Figure 3A:
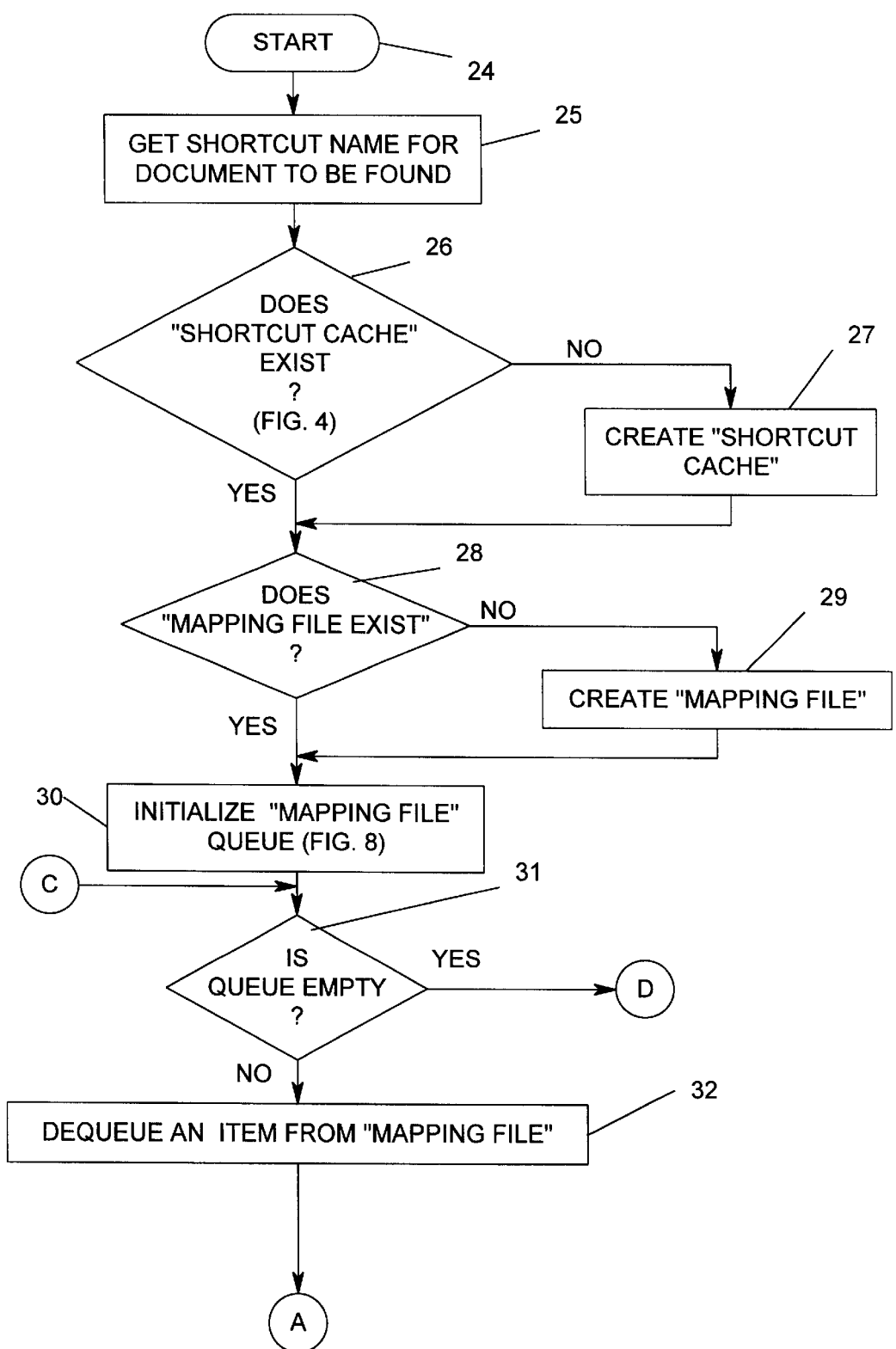
FIGS. 3A through 3C when combined form a flow chart of the method of the present invention.
Figure 3B:
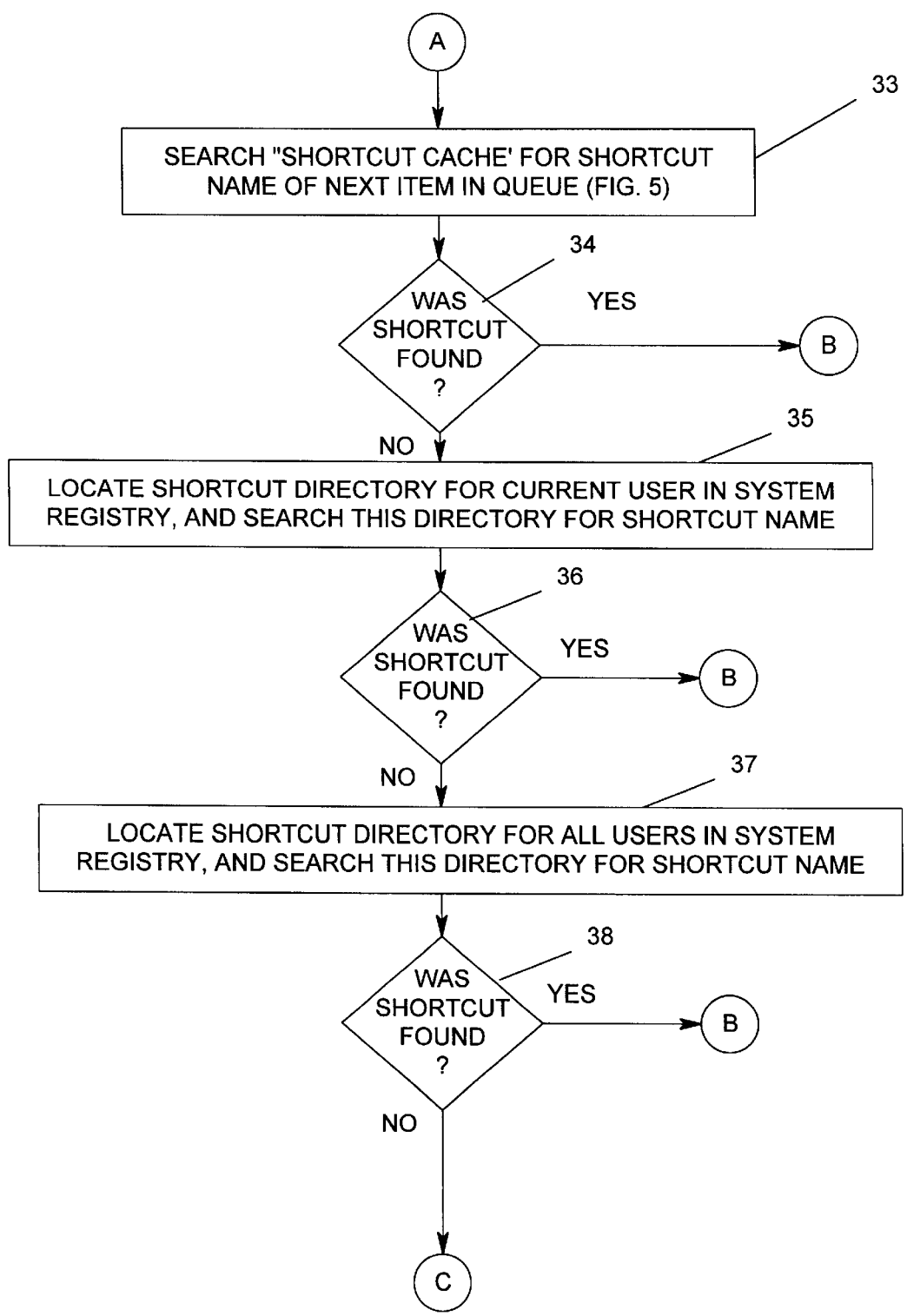
Figure 3C:
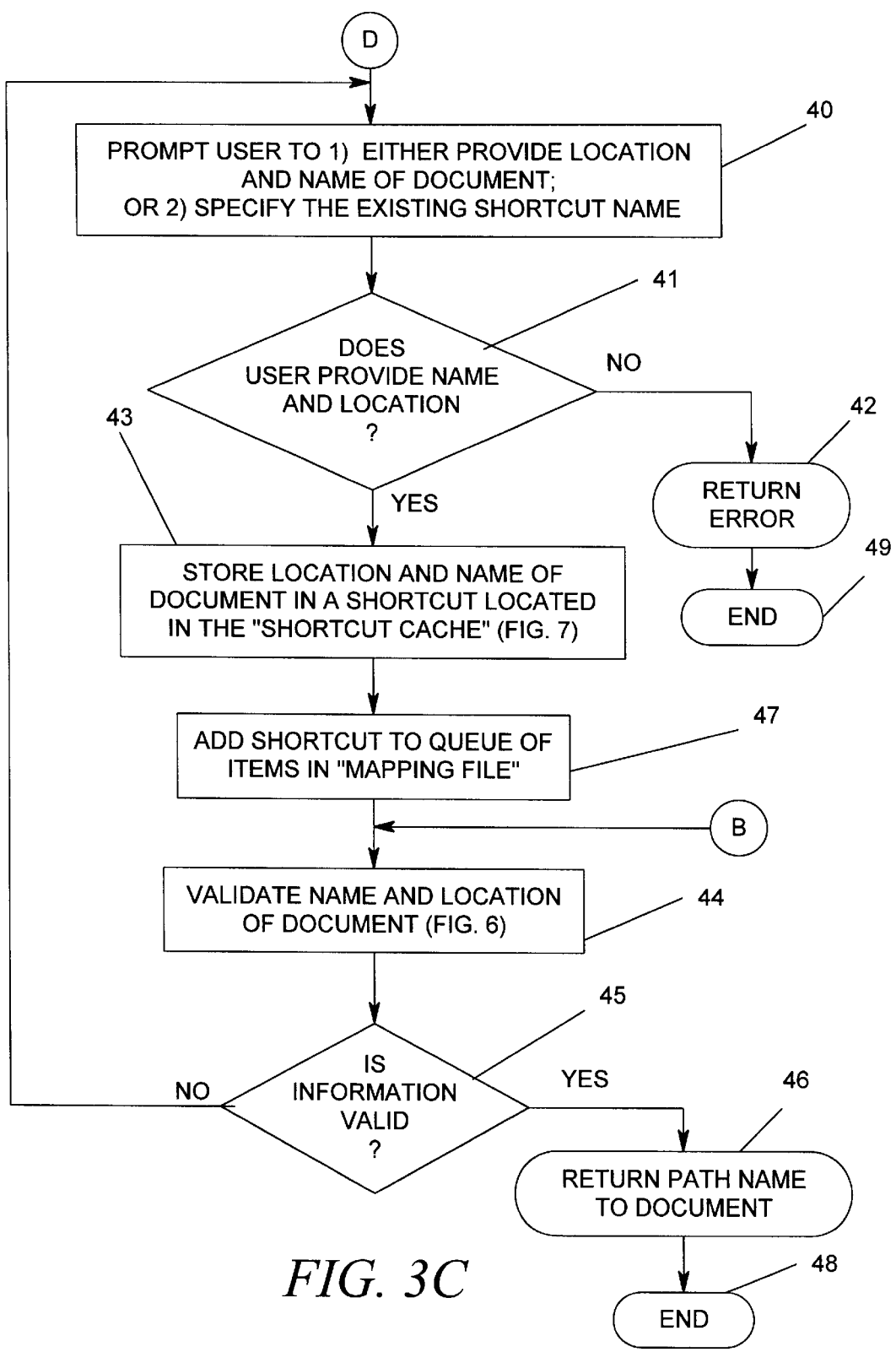
Figure 4:
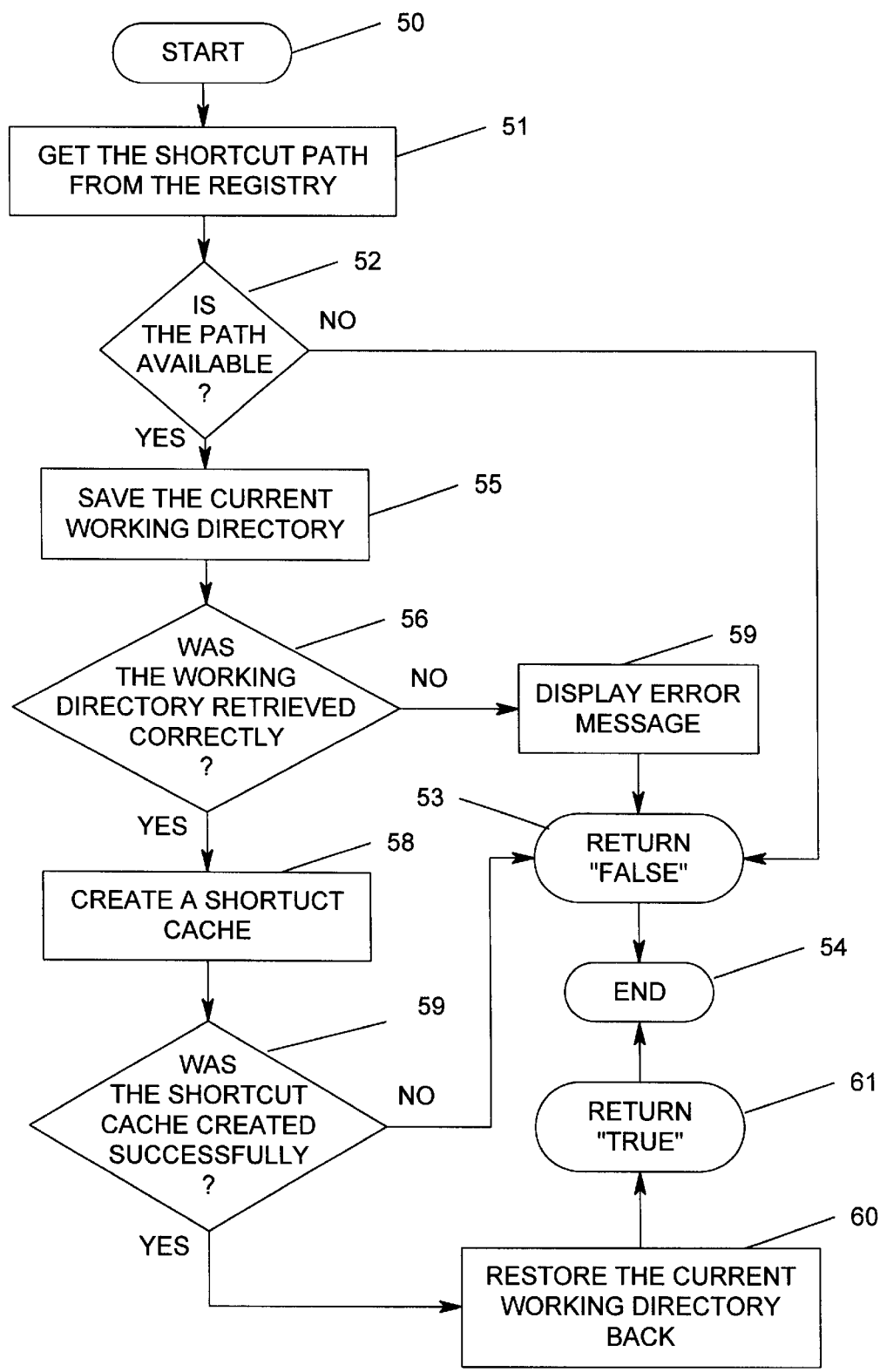
FIG. 4 is a flow chart of the process for verifying the existence of a shortcut directory.

Referring now to FIGS. 3A through 3C, a flow chart of the method of the present invention is shown. The process begins in FIG. 3A at a start bubble 24 followed by a process step (block 25) of getting the shortcut name for the document to be found. Next, an inquiry is made as to whether or not a shortcut cache exists (diamond 26). Details of this part of the process are illustrated in FIG. 4 and described further hereinafter.

Figure 8:
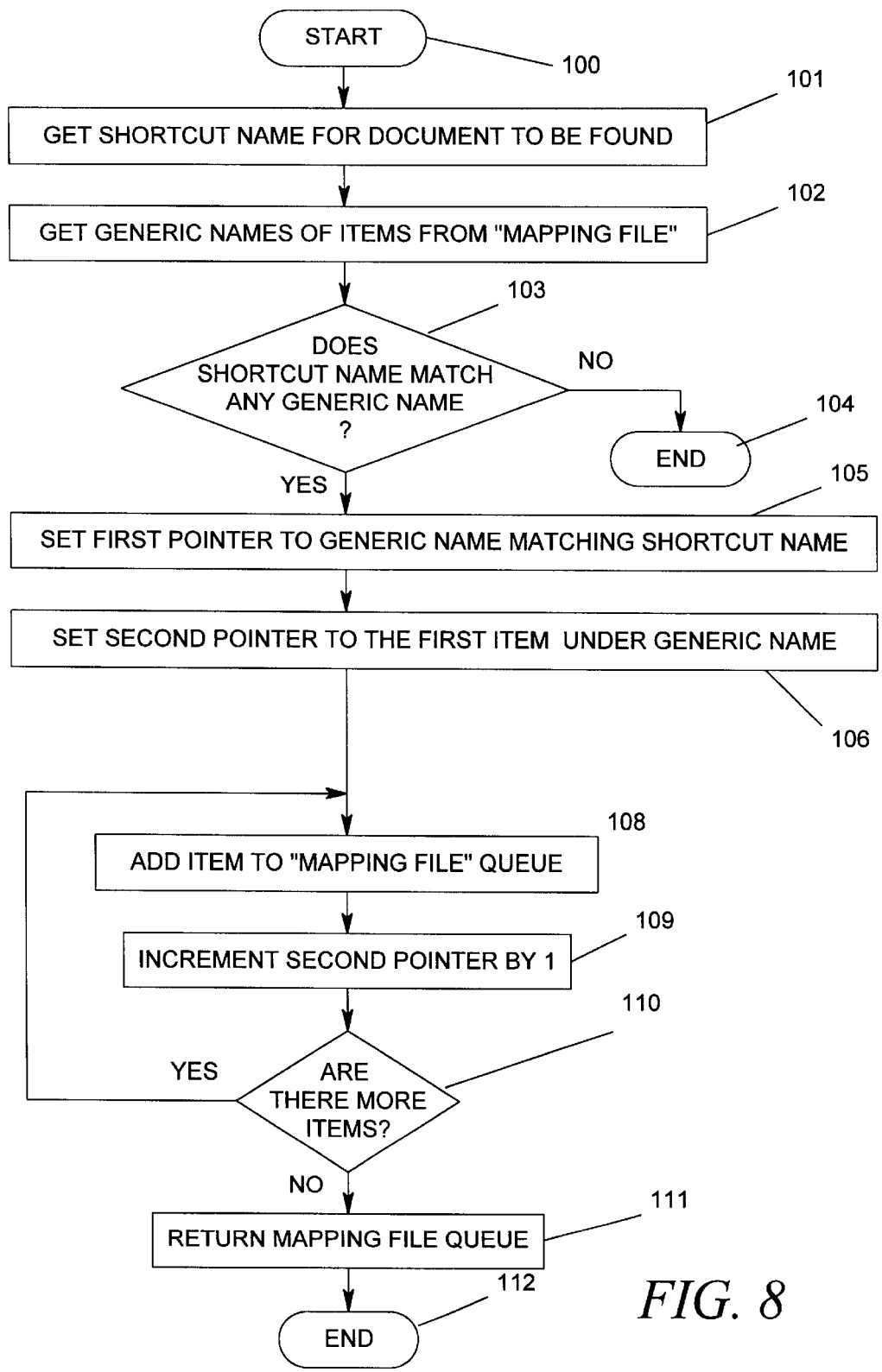
FIG. 8 is a flow chart of the process for initializing the mapping file and de-queuing items from it.

A shortcut cache as that term is used herein refers to a place where shortcut names are stored (e.g., a file in the local storage 23). If the answer to this inquiry is no, then a shortcut cache is created (block 27). Next, or if a shortcut cache already exists an inquiry is made as to whether or not a mapping file exists (diamond 28). If the answer to this inquiry is no, then a mapping file is created (block 29). A mapping file as that term is used herein refers to a place where shortcut names are stored in organized fashion enabling them to be accessible later. A mapping file can be a file in local storage 23, or a database disposed over the network 15 or any other conceivable form of storage media. If a mapping file already exists the queue of items in the mapping file corresponding to the shortcut name is initialized (block 30) and an inquiry is made as to whether the queue is empty (diamond 31). If the answer to this inquiry is no, then the process illustration continues in FIG. 3C as denoted by a connector D. Details of this part of the process of initialization of the mapping file queue is illustrated in FIG. 8 and described further hereinafter. If the queue in the mapping file is not empty, the items matching the shortcut name are de-queued from the mapping file (block 32). The process illustration continues in FIG. 3B as denoted by a connector A.

Figure 5:
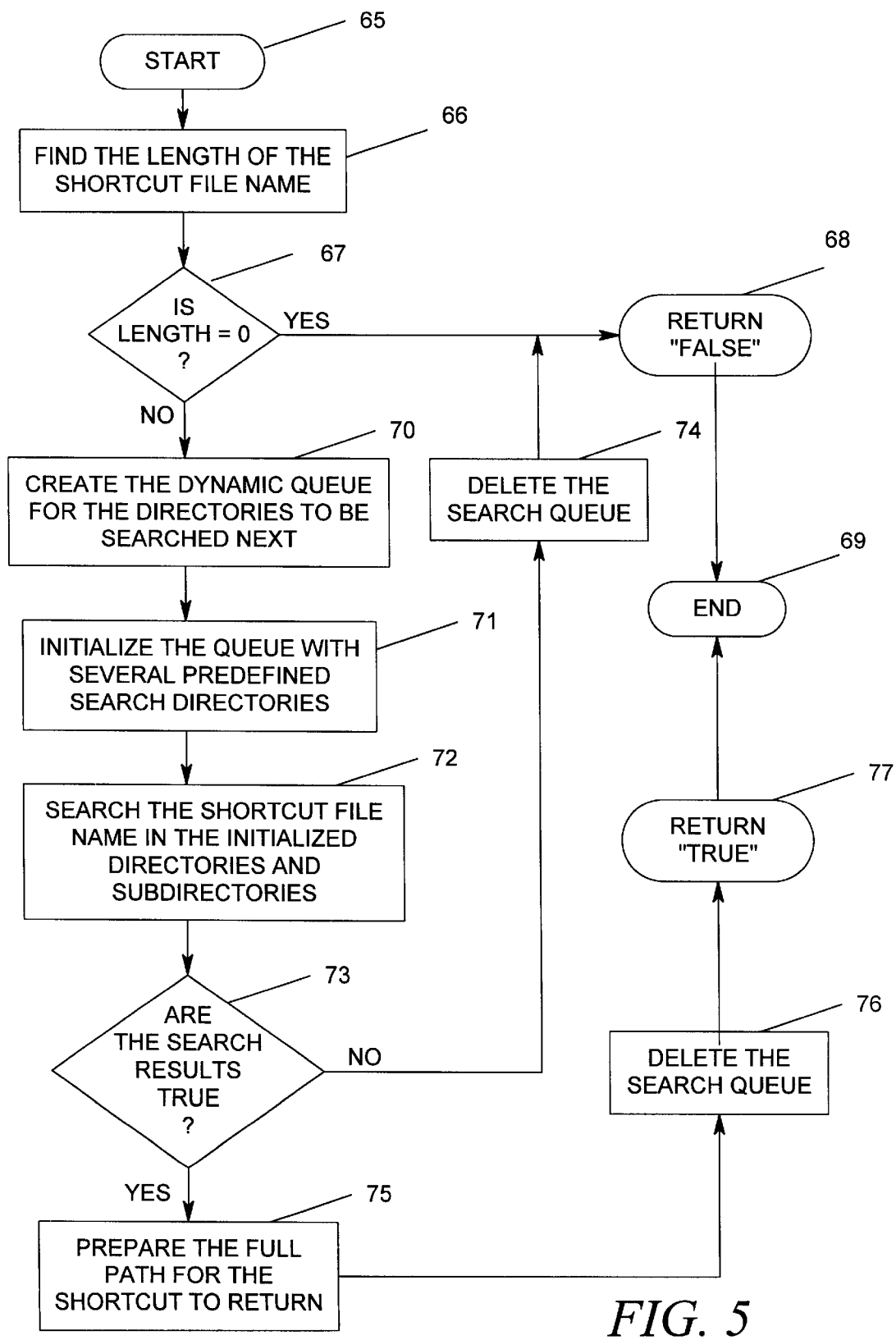
FIG. 5 is a flow chart of the process for searching the full path for the shell link file.

Referring now to FIG. 3B at the connector A, a search is made of the shortcut cache for a shortcut name (block 33). Details of the shortcut cache search are illustrated in FIG. 5 and amplified further hereinafter. An inquiry is made as to whether or not the shortcut was found (diamond 34). If the answer to this inquiry is no, then the shortcut directory for the current user is located in the system directory and a search is made thereof for the shortcut name (block 35). After this, another inquiry is made as to whether or not the shortcut was found (diamond 36). If the answer to this inquiry is no, the shortcut directory for all users is located in the system registry and a search is made thereof for the shortcut name (block 37). Details of this step are illustrated in FIG. 5 and amplified further hereinafter. Yet another inquiry is made as to whether or not the shortcut was found (diamond 38). If the answer to this inquiry is yes, then a branch is taken to a part of the process illustrated in FIG. 3C as denoted by a connector B. On the other hand, if the answer to this inquiry is no, then a branch is taken to a part of the process illustrated in FIG. 3a as denoted by connector C.

Referring now to FIG. 3C at the connector D, the user is prompted to either provide the location and name of the document, or specify an existing shortcut name (block 40). An inquiry is next made as to whether or not the user provides the name and location requested (diamond 41). If the user does not, then an error is returned (bubble 42) and the process is terminated (bubble 47). On the other hand, if the user does provide the requested name and location, then the location and name of the document is stored in a shortcut located in the shortcut cache (block 43). This step of the process is illustrated in more detail in FIG. 7 and amplified hereinafter. Then, the shortcut is added to the queue of items in the mapping file (block 47). Following this, a validation is made (block 44). This step of the process is illustrated in detail in FIG. 6 and amplified hereinafter. Another inquiry is made as to whether or not the information provided is valid (diamond 45). If the answer to this inquiry is no, then a return is made back to the process block 40 to prompt the user again.

If the user-provided information is valid (yes answer to the inquiry diamond 45), then the path name is returned to the executable (bubble 46) and the process ends (bubble 48). Returning briefly to FIG. 3B, at the diamond 34, if the shortcut is found on the first try, then a branch is made to the block 44 (FIG. 3C) to validate the name and location of the document, as denoted by a connector B. Again returning to FIG. 3B, if the answer to the inquiry in the diamond 36 or diamond 38 is yes and a shortcut is found, then a branch is taken to the process block 44 for validation of the name and location of the document, as denoted by the connector B.

Referring now to FIG. 4, a flow chart of the process for verifying the existence of a shortcut cache is shown. This part of the process verifies the existence of a shortcut cache for an application. If one is not there, then one is created. The process begins with a start bubble 50 followed by a process step of getting the shortcut path for the registry (block 51). An inquiry is next made as to whether or not this path is available (diamond 52). If the answer to this inquiry is no, then a return of "False" is made (bubble 53) and the process ends (bubble 54).

If the requested path is available, i.e., yes exit from the diamond 52, then the current working directory is saved (block 55). After this, an inquiry is made as to whether or not the working directory was retrieved correctly (diamond 56). If the answer to this inquiry is no, then an error message is displayed (block 57). On the other hand, if the working directory was retrieved correctly, then a shortcut cache is created (block 58). Next, an inquiry is made as to whether or not the shortcut cache was created successfully (diamond 59). If the answer to this inquiry is no, then a return of "false" is made (bubble 53) and the process ends (bubble 54).

If the shortcut cache was successfully created, i.e., yes leg from the diamond 59, then the current working directory is restored (block 60). After this, a return of "true" is made (bubble 61) and the process ends (bubble 54).

Referring now to FIG. 5, a flow chart of the process for searching for the system file representing the shortcut is shown. The process begins with a start bubble 65 followed by a process step of finding the length of the shortcut file name (block 66). Next, an inquiry is made as to whether or not the length is equal to zero (length=0, diamond 67). If the answer to this inquiry is yes, then a return of "false" is made (bubble 68) and the process ends (bubble 69).

If the length does not equal zero, i.e., no exit from the diamond 67, then the dynamic queue for the directories to be searched next is created (block 70). Next, the queue is initialized with several predefined search directories (block 71). Then a search is made for the shortcut file name in the initialized directories and sub-directories (block 72). After this, an inquiry is made as to whether or not the search results are true (diamond 73). If the answer to this inquiry is no, then the search queue is deleted (block 74), a return of false is made (bubble 68) and the process ends (bubble 69).

On the other hand, if the search results are true, i.e. yes exit from the diamond 73, then the full path is prepared for the shortcut to return (block 75). Next, the search queue is deleted (block 76), a return of "true" is made (bubble 77) and the process ends (bubble 69).

Figure 6:
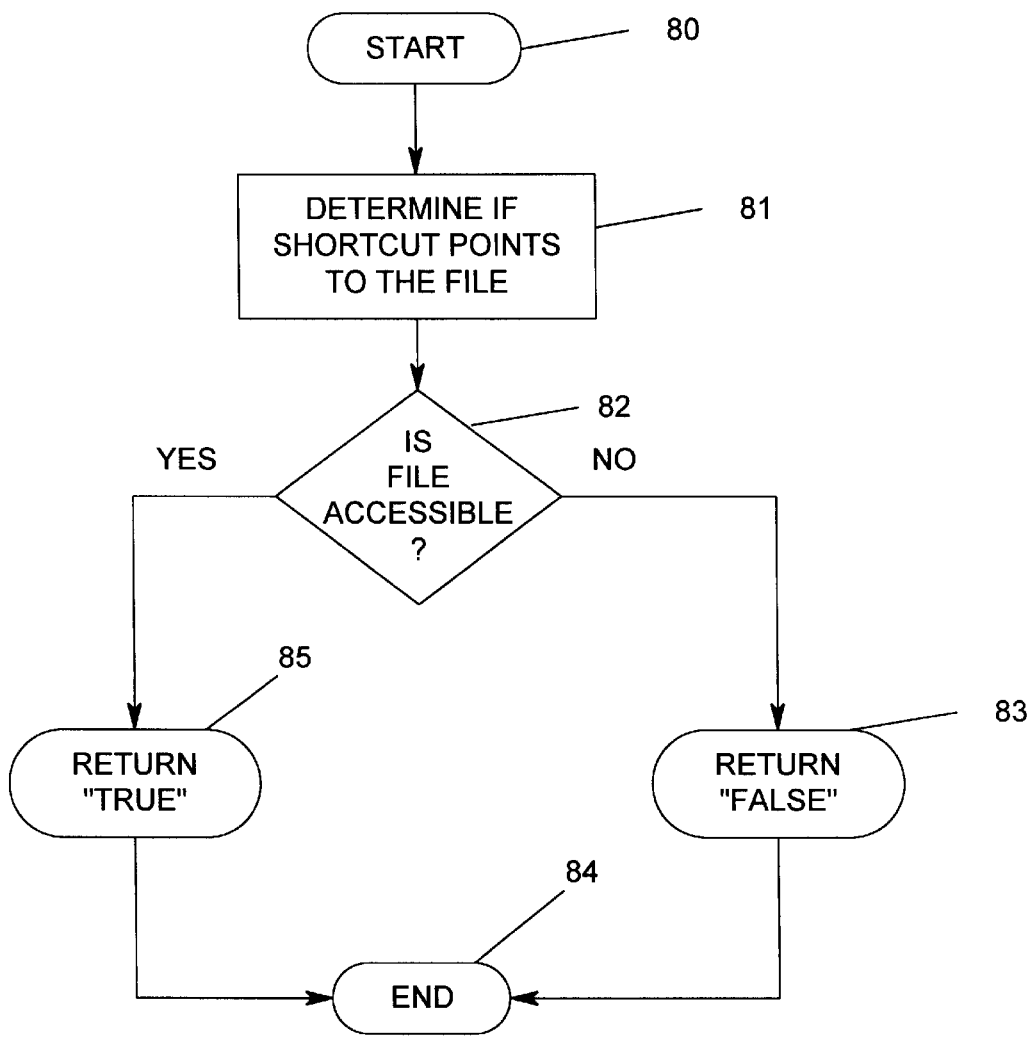
FIG. 6 is a flow chart of the process to verify if a file is available in the file system.

Referring now to FIG. 6, a flow chart of the process to verify if a file is available in the file system is shown. The process begins with a start bubble 80 followed by a process step of determining if the shortcut points to the file to be verified (block 81). Next, an inquiry is made as to whether or not the file is accessible (diamond 82). If the answer to this inquiry is no, then a return of "false" is made (bubble 83) and the process ends (bubble 84). On the other hand, if the file handle is valid, i.e., yes exit from the diamond 82, then a return of "true" is made (bubble 85) and the process ends (bubble 84).

Figure 7:
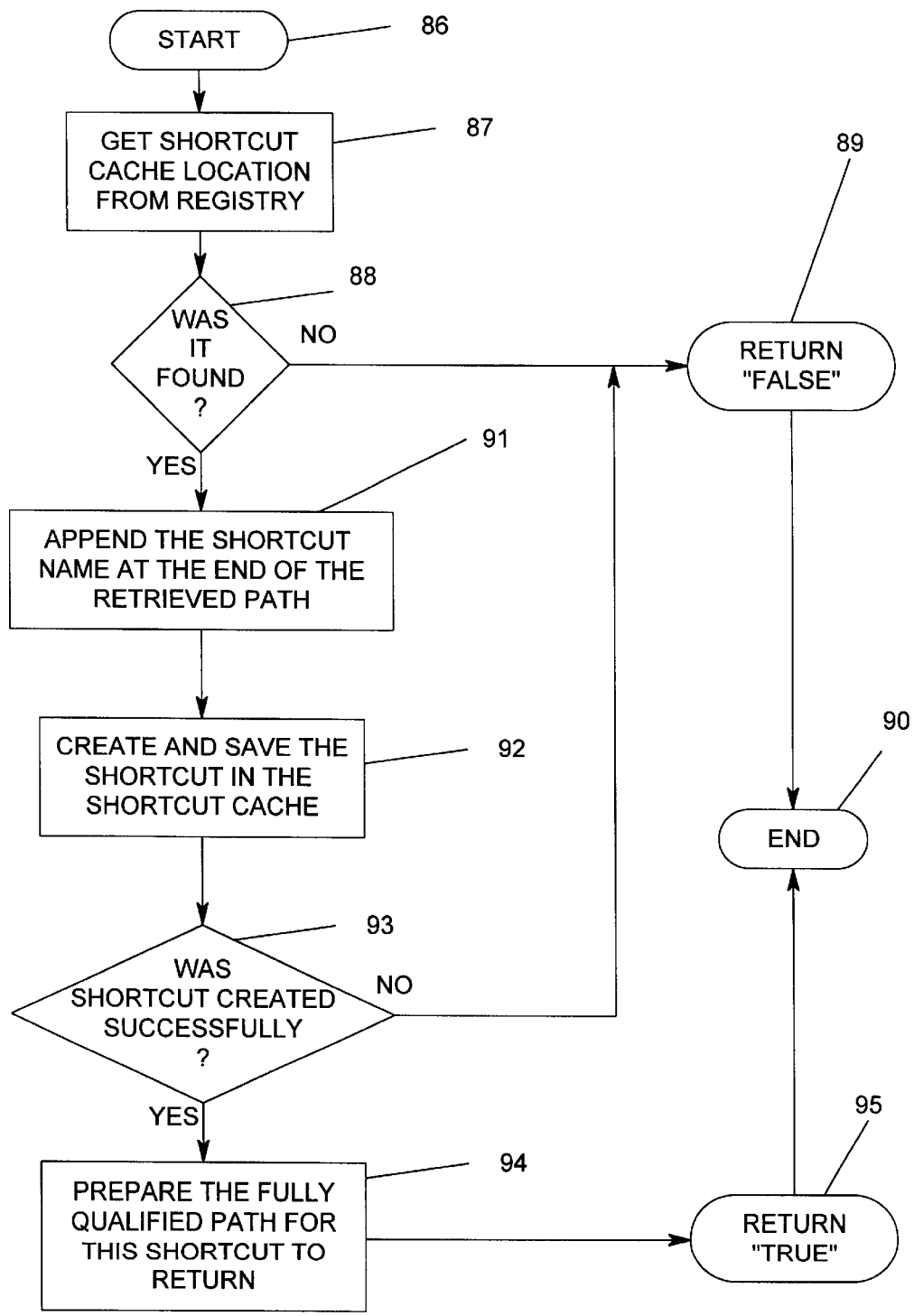
FIG. 7 is a flow chart of the process for creating a shortcut.

Referring now to FIG. 7, a flow chart of the process for creating a shortcut is shown. This part of the process creates a shortcut, i.e. a shell link for a particular object in the designated directory retrieved from the registry. The process begins with a start bubble 86 followed by a process step of getting the shortcut cache location from the registry (block 87). Next, an inquiry is made as to whether or not the location was found (diamond 88). If the answer to this inquiry is no, then a return of "false" is made (bubble 89) and the process ends (bubble 90).

If the shortcut cache location was found, i.e., the yes exit from the diamond 88, then the shortcut name is appended to the location (block 91). Next, the shortcut for the execution object passed in is created and saved in the shortcut cache (block 92). After this, an inquiry is made as to whether or not the shortcut was created successfully (diamond 93). If the answer to this inquiry is no, then a return of "false" is made (bubble 89) and the process ends (bubble 90). On the other hand, if the shortcut was successfully created, i.e., yes exit from the diamond 93, then the fully qualified path for this shortcut is prepared for return (block 94). Next, a return of "true" is made (bubble 95) and the process ends (bubble 90).

Referring now to FIG. 8, a flow chart of the process for initializing the mapping file. The process begins with a start bubble (bubble 100), followed by a process block of getting the shortcut name for the document to be found (block 101). Next, a process is executed to get the generic names of all shortcut categories from the mapping file (block 102). Then, an inquiry is made as to whether or not the shortcut name matches any of the generic names (diamond 103). If the answer to this inquiry is no, then the process is terminated (bubble 104). On the other hand if the answer to this inquiry is yes, then a first pointer is set to the generic name matching the shortcut name in the mapping file (block 105). After this, a second pointer is set to the first item under the previously mentioned generic name category (block 106). After this, a process is executed to extract the item from the mapping file as pointed to by the second pointer and to add the item to the mapping file queue (block 108). Then, the second pointer is incremented by 1 (block 109) and an inquiry is made to determine whether or not there are more items (diamond 110). If the answer to the inquiry is yes then the process goes back to the process block 108. On the other hand, if the answer to this inquiry is no then the process returns the mapping file queue (block 111) and is terminated (bubble 112).

The methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A method in a computer system for programmatically locating any file and building a shortcut for future reference to said file, said method comprising the steps of:

a. creating a shortcut cache if one does not exist;

b. creating a mapping file if one does not exist for storing name and versions of all files used in said computer system;

c. searching said mapping file for a shortcut name for said file, and if not found;

d. searching said shortcut cache for a shortcut name for said file, and if not found;

e. locating the shortcut directory for the current user in the system registry, and searching said directory for said shortcut name, and if not found;

f. locating the shortcut directory for all users in the system registry, and searching said directory for said shortcut name, and if found;

g. storing said shortcut, which contains the location and name of said file, in said shortcut cache;

h. logging data into said mapping file representative of the name and location of each shortcut located;

i. returning said location and name of said file to the requestor;

j. updating said mapping file each time a new version of said shortcut is located.

2. A method according to claim 1 where in step f thereof said shortcut directory is not found, further including the step of prompting the user to provide the location and name of said file.

3. A method according to claim 1 where in step f thereof said shortcut directory is not found, further including the step of prompting the user to specify the existing shortcut name.

4. A method according to claim 1 where said shortcut may refer to any file containing a path pointing to the location of said file.

5. In a distributed computer system having more than one computer connected through a network, a method for programmatically locating any remote file and building a shortcut for future reference to said remote file, said method comprising the steps of:
   a. creating a shortcut cache in a first computer if one does not exist;
   b. creating a mapping file in said first computer if one does not exist for storing name and versions of all remote files used in said computer system;
   c. searching said mapping file in said first computer for a shortcut name for said remote file, and if not found;
   d. searching said shortcut cache in said first computer for a shortcut name for said remote file, and if not found;
   e. locating a shortcut directory for the current user in the system registry of said first computer, and searching said shortcut directory for said shortcut name, and if not found;
   f. locating the shortcut directory for all users in the system registry of said first computer and search said directory for said shortcut name, and if found;
   g. storing said shortcut, which contains the location and name of said remote file, in said shortcut cache;
   h. logging data into said mapping file representative of the name and location of each shortcut of said remote file located;
   i. returning said location and name of said remote file to the requestor; and,
   j. updating said mapping file each time a new version of said shortcut of said remote file is located.

6. A method according to claim 5 where in step e thereof said shortcut directory is not found, further including the step of prompting the user to provide the location and name of said remote file.

7. A method according to claim 5 where in step e thereof said shortcut directory is not found, further including the step of prompting the user to specify the existing shortcut name.

8. A storage medium encoded with machine-readable computer program code for programmatically locating any file and building a shortcut for future reference to said file, wherein, when the computer program is executed by a computer, the computer program performs the steps of:
   a. creating a shortcut cache if ones does not exist;
   b. creating a mapping file if one does not exist for storing name and versions of all files used in said computer system;
   c. searching said mapping file for a shortcut name for said file, and if not found;
   d. searching said shortcut cache for a shortcut name for said file, and if not found;
   e. locating the shortcut directory for the current user in the system registry, and searching said directory for said shortcut name, and if not found;
   f. locating the shortcut directory for all users in the system registry, and searching said directory for said shortcut name, and if found;
   g. storing said shortcut, which contains the location and name of said file, in said shortcut cache;
   h. logging data into said mapping file representative of the name and location of each shortcut located;
   i. returning said location and name of said file to the requestor;
   j. updating said mapping file each time a new version of said shortcut is located.

9. A storage medium as in claim 8 where in step e thereof said shortcut directory is not found, further including the step of prompting the user to provide the location and name of said file.

10. A storage medium as in claim 8 where in step e thereof said shortcut directory is not found, further including the step of prompting the user to specify each existing shortcut name.

11. A storage medium as in claim 8 where said shortcut may refer to any file containing a path pointing to the location of a file of an application.

12. A storage medium encoded with machine-readable computer program code for programmatically locating any remote file and building a shortcut for future reference to said remote file, wherein, when the computer program is executed in a distributed computer system having more than one computer connected through a network, the computer program performs the steps of:
   a. creating a shortcut cache in a first computer if one does not exist;
   b. creating a mapping file in said first computer if one does not exist for storing name and versions of all remote files used in said computer system;
   c. searching said mapping file in said first computer for a shortcut name for said remote file, and if not found;
   d. searching said shortcut cache in said first computer for a shortcut name for said remote file, and if not found;
   e. locating a shortcut directory for the current user in the system registry of said first computer, and searching said shortcut directory for said shortcut name, and if not found;
   f. locating the shortcut directory for all users in the system registry of said first computer, and search said directory for said shortcut name, and if found;
   g. storing said shortcut, which contains the location and name of said remote file, in said shortcut cache;
   h. logging data into said mapping file representative of the name and location of each shortcut of said remote file located;
   i. returning said location and name of said remote file to the requestor; and,
   j. updating said mapping file each time a new version of said shortcut of said remote file is located.

13. A storage medium as in claim 12 where in step e thereof said shortcut directory is not found, further including the step of prompting the user to provide the location and name of said remote file.

14. A storage medium as in claim 12 where in step e thereof said shortcut directory is not found, further including the step of prompting the user to specify the existing shortcut name.

* * * * *